(12) United States Patent
Loebner et al.

(10) Patent No.: US 11,152,162 B2
(45) Date of Patent: Oct. 19, 2021

(54) CHARGING MECHANISM FOR CHARGING A STORED-ENERGY SPRING OF A STORED-ENERGY SPRING MECHANISM

(71) Applicant: SIEMENS AKTIENGESELLSCHAFT, Munich (DE)

(72) Inventors: Friedrich Loebner, Berlin (DE); Lukas Binner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/956,679

(22) PCT Filed: Nov. 22, 2018

(86) PCT No.: PCT/EP2018/082180
§ 371 (c)(1),
(2) Date: Jun. 22, 2020

(87) PCT Pub. No.: WO2019/120851
PCT Pub. Date: Jun. 27, 2019

(65) Prior Publication Data
US 2020/0328034 A1    Oct. 15, 2020

(30) Foreign Application Priority Data

Dec. 20, 2017   (DE) .......................... 102017223358.3

(51) Int. Cl.
*F16D 41/04* (2006.01)
*H01H 3/30* (2006.01)

(52) U.S. Cl.
CPC ........... *H01H 3/3005* (2013.01); *F16D 41/04* (2013.01); *H01H 3/3031* (2013.01)

(58) Field of Classification Search
USPC ....................................................... 200/400
See application file for complete search history.

(56) References Cited

U.S. PATENT DOCUMENTS

| 2016/0240330 A1 | 8/2016 | Huang et al. |
| 2017/0343089 A1 | 11/2017 | Bartz et al. |

FOREIGN PATENT DOCUMENTS

| CN | 201956270 U | 8/2011 |
| DE | 102014224405 A1 | 6/2016 |

(Continued)

*Primary Examiner* — Toan T Vu
*Assistant Examiner* — Xuan Ly
(74) *Attorney, Agent, or Firm* — Laurence A. Greenberg; Werner H. Stemer; Ralph E. Locher (57) ABSTRACT

A charging mechanism charges a stored-energy spring of a stored-energy spring mechanism. The charging mechanism contains a charging gear coupled to the stored-energy spring, an intermediate shaft coupled to the charging gear, an idler gear driven by a charging motor, a freewheel coupled to the idler gear, and a dog clutch that couples the freewheel to the intermediate shaft to charge the stored-energy spring and uncouples same from the intermediate shaft in the charged state. The dog clutch contains a first clutch block that is non-rotatably coupled to the intermediate shaft, a second clutch block connected to the freewheel, and a synchronizer ring arranged between the clutch blocks and is non-rotatably coupled to the first clutch block. During a rotation relative to the second clutch block, the synchronizer ring couples in a form-fitting manner to the second clutch block in a first direction of rotation about the axis of rotation.

15 Claims, 7 Drawing Sheets

(56) References Cited

FOREIGN PATENT DOCUMENTS

| | | | |
|---|---|---|---|
| RU | 2259612 | C2 | 8/2005 |
| RU | 2263994 | C1 | 11/2005 |
| RU | 2388093 | C2 | 4/2010 |
| SU | 405136 | A1 | 10/1973 |
| WO | WO2016083042 | * | 6/2016 |

* cited by examiner

CHARGING MECHANISM FOR CHARGING A STORED-ENERGY SPRING OF A STORED-ENERGY SPRING MECHANISM

BACKGROUND OF THE INVENTION

Field of the Invention

The invention relates to a tensioning mechanism for tensioning an accumulator spring of a spring stored energy mechanism, in particular for a circuit breaker.

Spring stored energy mechanisms are used, in particular, as drives for switching circuit breakers. Circuit breakers are electric switches which are designed for high electric currents and voltages, in order for it to be possible, in particular, for high overload currents and short circuit currents to be switched off safely. To this end, circuit breakers have an interrupter unit with at least one movable switching element for opening and closing a current path. In order to move the switching elements in the case of a switching operation, circuit breakers keep energy which is required for the switching operation ready. Spring stored energy mechanisms store said energy in accumulator springs which are tensioned in order to store the energy. An accumulator spring is tensioned, for example, by way of a tensioning motor which is connected via a tensioning mechanism to the accumulator spring. In an analogous manner, spring stored energy mechanisms are also used, for example, as drives for switching load break switches.

SUMMARY OF THE INVENTION

The invention is based on the object of specifying an improved tensioning mechanism for tensioning an accumulator spring of a spring stored energy mechanism.

The object is achieved by way of a tensioning mechanism with the features of the independent claim.

Advantageous refinements of the invention are the subject matter of the dependent claims.

A tensioning mechanism according to the invention for tensioning an accumulator spring of a spring stored energy mechanism comprises a tensioning gear which is coupled to the accumulator spring, an intermediate shaft which is coupled to the tensioning gear, an intermediate gear which can be driven by a tensioning motor, a freewheel which is coupled to the intermediate gear, and a dog clutch with a first clutch block which is coupled fixedly to the intermediate shaft so as to rotate with it, a second clutch block which is connected to the freewheel, and a synchronizer ring which is arranged between the clutch blocks, is coupled fixedly to the first clutch block so as to rotate with it, can be displaced parallel to a rotational axis of the intermediate shaft relative to the first clutch block, and is pressed onto the second clutch block. It is possible for the first clutch block to be displaced parallel to the rotational axis between a first end position which it assumes in the case of tensioning of the accumulator spring, and a second end position which it assumes in a tensioned state of the accumulator spring. In the first end position, the first clutch block bears against the second clutch block and closes the dog clutch. In the second end position, the two clutch blocks are disconnected from one another and the dog clutch is open. The synchronizer ring couples in a positively locking manner to the second clutch block in the case of a rotation relative to the second clutch block in a first rotational direction about the rotational axis, and, in the case of an open dog clutch, it is possible for said synchronizer ring to be rotated relative to the second clutch block in a second rotational direction about the rotational axis, which second rotational direction is opposed to the first rotational direction.

In the case of the tensioning of the accumulator spring, the intermediate shaft transmits rotations of the intermediate gear via the freewheel and the dog clutch to the tensioning gear and, as a result, makes the tensioning of the accumulator spring possible by way of the tensioning motor which drives the intermediate gear directly or indirectly. In the tensioned state of the accumulator spring, the dog clutch decouples the intermediate shaft from the freewheel and the intermediate gear, with the result that no forces are transmitted to the intermediate shaft and the tensioning gear by way of the intermediate gear, in particular in the case of the tensioning motor continuing to run after the tensioning of the accumulator spring. Without the dog clutch, in the tensioned state of the accumulator spring, said forces would be transmitted to the intermediate shaft and to components of the tensioning mechanism which are coupled to the intermediate shaft, and would stress and load them. The dog clutch therefore advantageously relieves the intermediate shaft and components of the tensioning mechanism which are coupled to it in the tensioned state of the accumulator spring.

As a result of the fixed coupling of the first clutch block to the intermediate shaft so as to rotate with it, rotations of the intermediate shaft are transmitted to the first clutch block. The displacement capability of the first clutch block firstly makes possible its coupling to the second clutch block and the freewheel in order to tension the accumulator spring, and secondly makes possible the decoupling of the clutch blocks in the tensioned state of the accumulator spring.

The synchronizer ring makes synchronizing of rotations of the two clutch blocks possible before the dog clutch closes, since the synchronizer ring couples to the second clutch block in a positively locking manner in the case of rotations relative to the second clutch block in a first rotational direction, with the result that the second clutch block is subsequently driven by the synchronizer ring. When the dog clutch closes, the rotations of the two clutch blocks are therefore already synchronized.

Secondly, in the case of an open dog clutch, the synchronizer ring makes rotations of the first clutch block relative to the second clutch block possible in a second rotational direction which is opposed to the first rotational direction. As a result, in particular, rotations of the second clutch block are made possible which are caused by way of the tensioning motor continuing to run when, after the tensioning of the accumulator spring, the tensioning gear and the intermediate shaft are at a standstill and the first clutch block therefore cannot rotate.

One refinement of the invention provides that the synchronizer ring has a plurality of ramp-shaped projections which face the second clutch block and are arranged around the intermediate shaft, and the second clutch block has a plurality of coupling teeth which are arranged around the intermediate shaft and against which in each case one ramp-shaped projection of the synchronizer ring bears in the case of a rotation of the synchronizer ring relative to the second clutch block in the first rotational direction about the rotational axis, and over which coupling teeth the ramp-shaped projections of the synchronizer ring can slide in the case of a rotation of the synchronizer ring relative to the second clutch block in the second rotational direction about the rotational axis. The coupling teeth are, for example, directed toward the outside radially with respect to the rotational axis in a plane which is perpendicular with respect to the rotational axis. This refinement of the invention realizes the abovementioned positively locking coupling of the synchronizer ring to the second clutch block in the case of rotations relative to the second clutch block in the first rotational direction by way of the ramp-shaped projections of the synchronizer ring bearing against the coupling teeth of the second clutch block. Furthermore, this refinement of the invention realizes the rotations of the synchronizer ring relative to the second clutch block in the second rotational direction by way of the ramp-shaped projections of the synchronizer ring sliding over the coupling teeth of the second clutch block in the second rotational direction.

The ramp-shaped projections of the synchronizer ring and the coupling teeth of the second clutch block are preferably arranged equidistantly along a circle about the rotational axis in each case in a plane which is perpendicular with respect to the rotational axis. As a result, in the case of rotations relative to the second clutch block in the first rotational direction, the ramp-shaped projections can at the same time bear in each case against a coupling tooth and, in the case of rotations relative to the second clutch block in the second rotational direction, can at the same time run over a coupling tooth.

A further refinement of the invention provides that the synchronizer ring has four ramp-shaped projections, and the second clutch block has four coupling teeth. In each case four ramp-shaped projections and coupling teeth have proven to be an advantageous compromise between loading of the ramp-shaped projections and coupling teeth and the required spacing of the ramp-shaped projections and coupling teeth. Firstly, the loading of the ramp-shaped projections and coupling teeth namely increases as the number of ramp-shaped projections and coupling teeth decreases. Secondly, for the positively locking coupling of the ramp-shaped projections and coupling teeth, a sufficient spacing of the ramp-shaped projections and coupling teeth is required, since the clutch blocks rotate rapidly relative to one another.

A further refinement of the invention provides at least one spring element which couples the synchronizer ring to the first clutch block and presses the synchronizer ring onto the second clutch block. This makes it possible, in particular, that the synchronizer ring remains pressed onto the second clutch block in the case of axial displacements of the first clutch block. Furthermore, axial displacements of the synchronizer ring are made possible, in particular if the ramp-shaped projections of the synchronizer ring slide over the coupling teeth of the second clutch block.

A further refinement of the invention provides that the clutch blocks have dogs which correspond to one another and, in the first end position of the first clutch block, couple the two clutch blocks to one another in a positively locking manner in the case of rotations of the first clutch block relative to the second clutch block in the second rotational direction. This makes it possible that, in the case of a closed dog clutch, the first clutch block is moved by the second clutch block after the clutch blocks are coupled to one another in a positively locking manner.

A further refinement of the invention provides a coupling element which is connected to the first clutch block, is guided through a transverse opening in the intermediate shaft, which transverse opening runs perpendicularly with respect to the rotational axis of the intermediate shaft, and can be displaced parallel to the rotational axis of the intermediate shaft in the transverse opening between a first position which defines a first end position of the first clutch block and a second position which defines the second end position of the first clutch block. The coupling element is configured, for example, as a tube or bolt, the longitudinal axis of which is arranged perpendicularly with respect to the rotational axis of the intermediate shaft and the ends of which protrude into recesses in the first clutch block. The coupling element makes a displacement of the first clutch block by way of a displacement of the coupling element possible.

Furthermore, for example, a switching pin is provided which is mounted displaceably in the intermediate shaft in a longitudinal opening running along the rotational axis of the intermediate shaft, and is coupled to the coupling element. As a result, the first clutch block can be displaced between its end positions via the coupling element by way of displacement of the switching pin.

Furthermore, it is provided, for example, that a resetting end of the switching pin protrudes out of the longitudinal opening in the intermediate shaft, and a resetting element is arranged on the tensioning gear, which resetting element displaces the resetting end of the switching pin toward the longitudinal opening in the tensioned state of the accumulator spring, with the result that the coupling element is displaced from its first into its second position. For example, the resetting element has a contact end which projects radially from the tensioning gear and has a contact face which bears against the resetting end of the switching pin in the case of the displacement of said switching pin. By way of the resetting element, the tensioning gear is coupled to the switching pin in a position, in which the accumulator spring is tensioned, the resetting element displacing the switching pin and opening the dog clutch as a result.

Each of the two clutch blocks preferably runs around the intermediate shaft in an annular manner. As a result, reliable coupling of the dog clutch to the intermediate shaft and the freewheel is made possible in a simple way.

Furthermore, for example, a restoring spring is provided which is coupled to the first clutch block and exerts a spring force in the direction of the second clutch block on the first clutch block. The first clutch block can be pushed to the second clutch block by way of the restoring spring when the resetting element releases the switching pin in the case of relieving of the accumulator spring. As a result, the dog clutch is closed again, and the tensioning mechanism is ready for renewed tensioning of the accumulator spring after the relieving of the accumulator spring.

The freewheel has, for example, a freewheel inner ring which runs around the intermediate shaft and to which the second clutch block is connected. As a result, reliable coupling of the dog clutch to the freewheel is made possible.

The intermediate gear can be driven, for example, via a bevel gear mechanism by way of the tensioning motor. As a result, a deflection of the drive force of the tensioning motor is achieved, which deflection makes a compact overall design of the spring stored energy mechanism possible.

Furthermore, the tensioning mechanism preferably has a locking mechanism for releasably locking the tensioning gear in a tensioned state of the accumulator spring. As a result, the tensioning gear can be locked in the tensioned state of the accumulator spring, with the result that the accumulator spring remains tensioned until the locking is released in order to release the energy which is stored by the accumulator spring.

A spring stored energy mechanism according to the invention has a tensioning mechanism according to the invention. The advantages of a spring stored energy mechanism of this type result from the abovementioned advantages of a tensioning mechanism according to the invention.

The above-described properties, features and advantages of this invention and the way that they are achieved will become clearer and more comprehensible in conjunction with the following description of exemplary embodiments which will be described in greater detail in conjunction with the drawings.

DETAILED DESCRIPTION OF THE INVENTION

Parts which correspond to one another are provided with the same designations in the figures.

Figure 1:
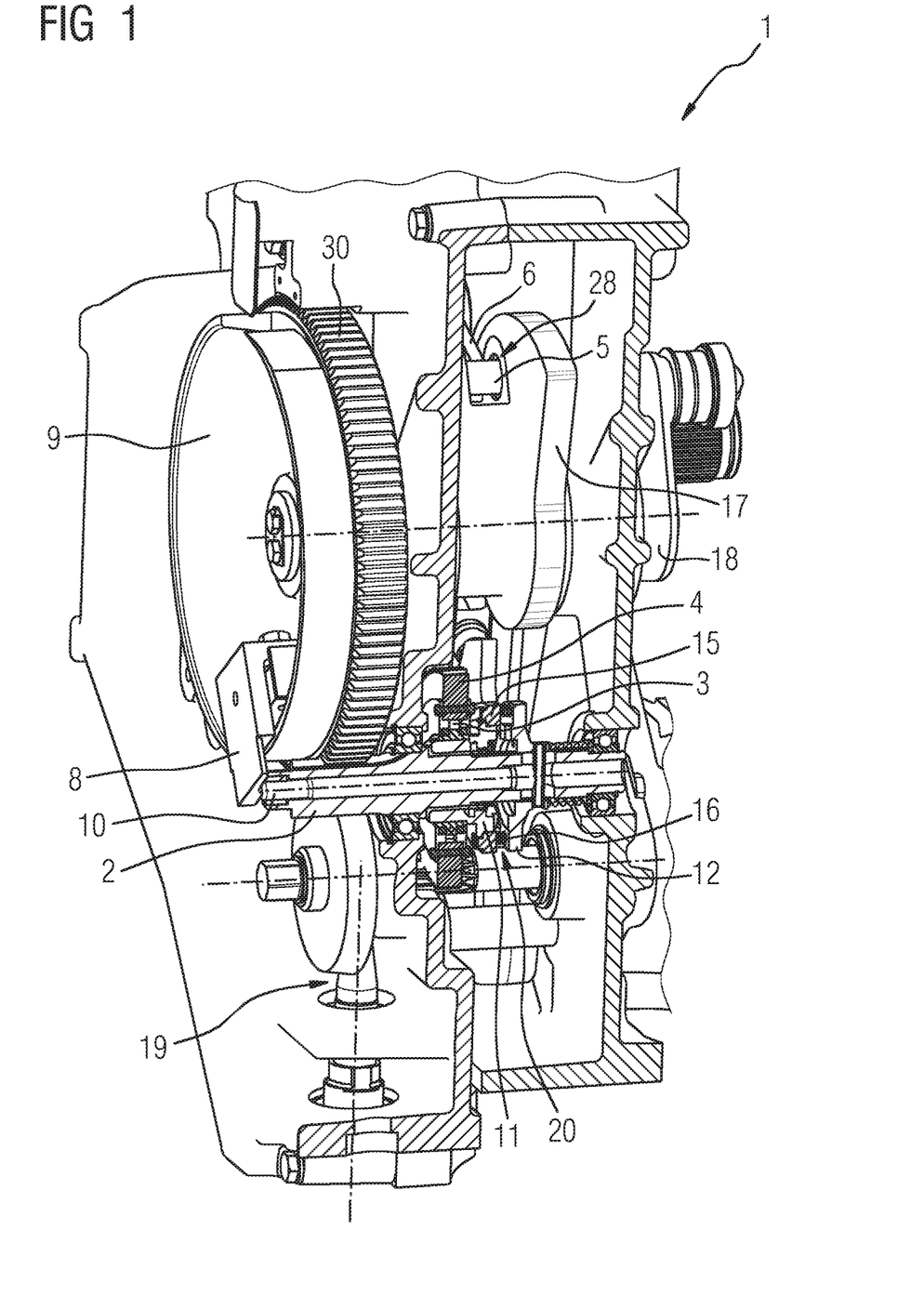
FIG. 1 shows a perspective and partially sectioned illustration of a tensioning mechanism.
Figure 2:
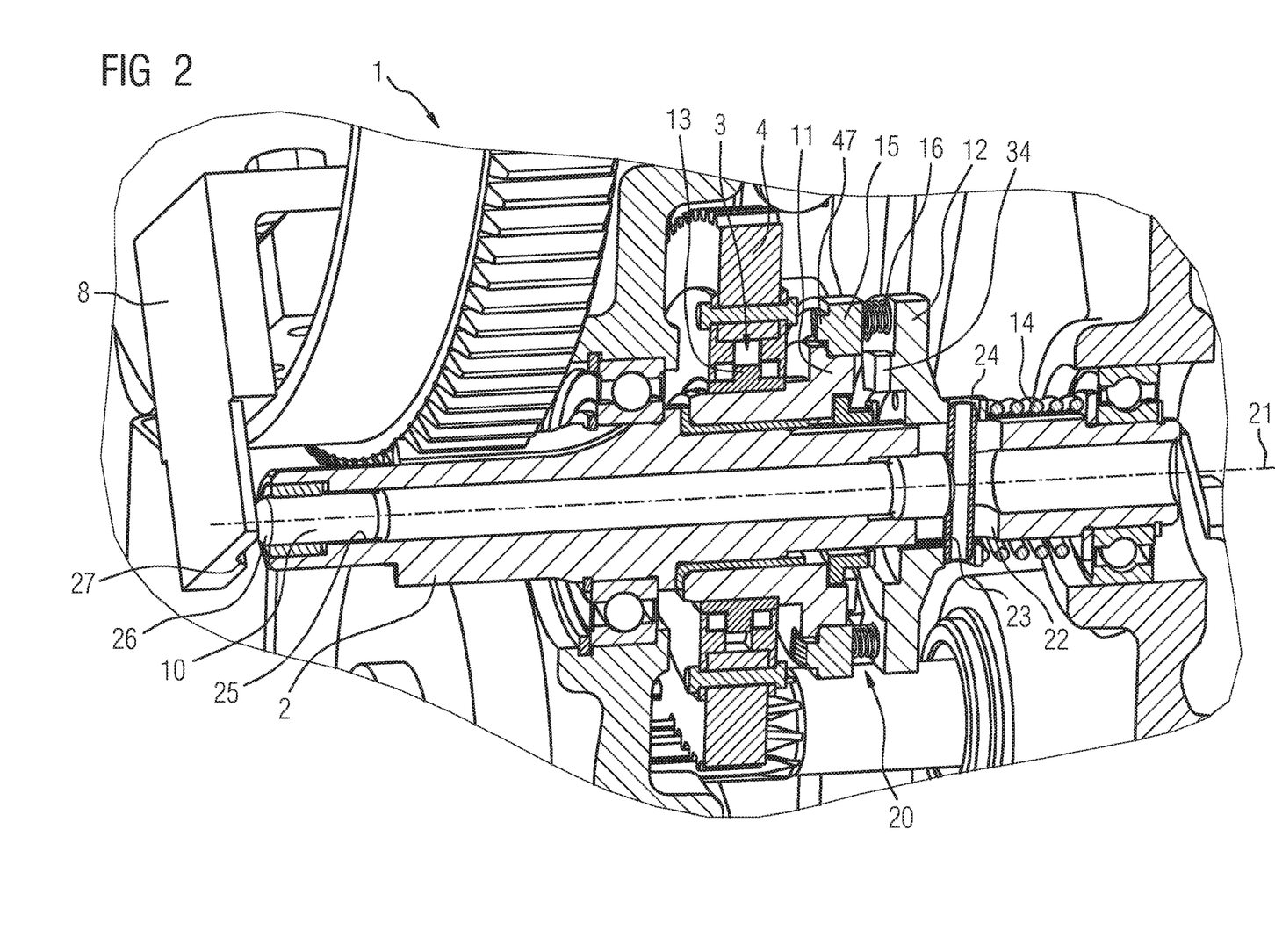
FIG. 2 shows an enlarged detail from FIG. 1.

FIGS. 1 and 2 show a tensioning mechanism 1 for tensioning an accumulator spring (not shown) of a spring stored energy mechanism in a perspective and partially sectioned illustration, FIG. 2 showing an enlarged detail from FIG. 1. The accumulator spring is, for example, a switch-on spring of the spring stored energy mechanism, which spring stores energy for closing a current path of a circuit breaker. The tensioning mechanism 1 comprises, inter alia, a tensioning gear 9, an intermediate shaft 2 and an intermediate gear 4.

The tensioning gear 9 is connected fixedly to a cam disk 17 and a tensioning shaft 18, and is coupled via the tensioning shaft 18 to the accumulator spring.

The intermediate gear 4 can be driven via a bevel gear mechanism 19 by a tensioning motor (not shown).

The intermediate shaft 2 is coupled to the tensioning gear 9 and the intermediate gear 4, in order to transmit rotations of the intermediate gear 4 to the tensioning gear 9 in order to tension the accumulator spring. The coupling between the intermediate shaft 2 and the tensioning gear 9 is a gearwheel coupling which is formed by a toothed rim 30 of the tensioning gear 9 and a gearwheel ring 32 (see FIGS. 3 to 5) of the intermediate shaft 2, which gearwheel ring 32 corresponds with said toothed rim 30.

The intermediate gear 4 is coupled via a freewheel 3 and a dog clutch 20 to the intermediate shaft 2, the freewheel 3 connecting the intermediate gear 4 to the dog clutch 20. The dog clutch 20 has a first clutch block 12 which is coupled fixedly to the intermediate shaft 2 so as to rotate with it, a second clutch block 11 which is connected to a freewheel inner ring 13 of the freewheel 3, a synchronizer ring 15 which is arranged between the clutch blocks 11, 12, and spring elements 16. The clutch blocks 11, 12 and the synchronizer ring 15 run in each case around the intermediate shaft 2 in an annular manner.

The first clutch block 12 can be displaced axially between two end positions, that is to say parallel to a rotational axis 21 of the intermediate shaft 2. In a first end position of the first clutch block 12, the dog clutch 20 is closed and couples the freewheel 3 and the intermediate gear 4 to the intermediate shaft 2 in order to tension the accumulator spring. Here, the clutch blocks 11, 12 bear against one another. In the second end position of the first clutch block 12, the clutch blocks 11, 12 are disconnected from one another and the dog clutch 20 is open. As a result, the dog clutch 20 couples the freewheel 3 and the intermediate gear 4 to the intermediate shaft 2 in order to tension the accumulator spring, and decouples the freewheel 3 and the intermediate gear 4 from the intermediate shaft 2 in the tensioned state of the accumulator spring.

The synchronizer ring 15 is coupled fixedly to the first clutch block 12 so as to rotate with it, and can be displaced axially relative to the first clutch block 12. To this end, the synchronizer ring 15 has axially running teeth 43 which protrude into cutouts 45 in the first clutch block 12 which correspond with them (see FIGS. 3 to 6 and 8). As an alternative, the first clutch block 12 can have axially running teeth which protrude into cutouts in the synchronizer ring 15 which correspond to them. Other connections of the synchronizer ring 15 to the first clutch block 12 which are fixed so as to rotate together but can be displaced axially are likewise possible. The spring elements 16 run axially between the first clutch block 12 and the synchronizer ring 15, with the result that the spring elements 16 exert axially acting spring forces between the synchronizer ring 15 and the first clutch block 12.

The synchronizer ring 15 is pressed by way of the spring elements 16 onto the second clutch block 11. In a way which is described in greater detail below, the synchronizer ring 15 couples with the second clutch block 11 in a positively locking manner in the case of a rotation relative to the second clutch block 11 in a first rotational direction about the rotational axis 21, and can be rotated in a second rotational direction opposed to the first rotational direction about the rotational axis 21 relative to the second clutch block 11 in the case of an open dog clutch 20 (in this regard, see FIGS. 3 to 8 and the description thereof). As a result, the synchronizer ring 15 synchronizes the rotations of the two clutch blocks 11, 12 in the case of rotations of the first clutch block 12 relative to the second clutch block 11 in the first rotational direction.

The freewheel 3 decouples the intermediate gear 4 from the intermediate shaft 2 in the case of the tensioning of the accumulator spring if the tensioning shaft 18 runs over a top dead center.

In order to couple the first clutch block 12 to the intermediate shaft 2 fixedly so as to rotate with it and in an axially displaceable manner, the first clutch block 12 and the intermediate shaft 2 have a spline system 29 (see FIGS. 3 to 6).

In order to displace the first clutch block 12 from its first end position into the second end position, the intermediate shaft 2 has a slot-like transverse opening 22 in the region of the first clutch block 12, which transverse opening 22 runs perpendicularly with respect to the rotational axis 21 through the intermediate shaft 2. A coupling element 23 which is connected to the first clutch block 12 is guided by way of the transverse opening 22, which coupling element 23 can be displaced in the transverse opening 22 between a first position which defines the first end position of the first clutch block 12 and a second position which defines the second end position of the first clutch block 12. In the exemplary embodiment which is shown in the figures, the coupling element 23 is configured as a tube, the ends of which protrude into recesses 24 in the first clutch block 12. As an alternative, however, the coupling element 23 can also be configured, for example, as a bolt.

Furthermore, the intermediate shaft 2 has a longitudinal opening 25 which runs along its rotational axis 21 and extends from the transverse opening 22 to a tensioning gear-side end of the intermediate shaft 2. A switching pin 10 is mounted axially displaceably in the longitudinal opening 25, which switching pin 10 has a resetting end 26 which protrudes out of the longitudinal opening 25, and extends in the longitudinal opening 25 as far as the coupling element 23.

A resetting element 8 is arranged on the tensioning gear 9, which resetting element 8 displaces the resetting end 26 of the switching pin 10 toward the longitudinal opening 25 in the tensioned state of the accumulator spring. The resetting element 8 has a contact end which projects radially from the tensioning gear 9 and has a contact face 27 which bears against the resetting end 26 of the switching pin 10 in the case of the displacement of the latter. The resetting element 8 is arranged, for example, on the tensioning gear 9 at a position, at which the contact face 27 makes contact with the resetting end 26 of the switching pin 10 when the tensioning gear 9 has rotated further by approximately three degrees after the tensioning shaft 18 has reached the top dead center.

Furthermore, a restoring spring 14 is coupled to the first clutch block 12, which restoring spring 14 runs helically around the intermediate shaft 2. The restoring spring 14 acts on an end of the first clutch block 12, which end faces away from the second clutch block 11, and exerts a spring force on the first clutch block 12 in the direction of the second clutch block 11.

Moreover, the tensioning mechanism 1 has a locking mechanism 28 for releasably locking the tensioning gear 9 in the tensioned state of the accumulator spring. The locking mechanism 28 of the exemplary embodiment which is shown in the figures has a cam disk roller 5, which is arranged on the cam disk 17, and a pawl 6 which fixes the cam disk roller 5 in order to lock the tensioning gear 9. After the disconnection of the clutch blocks 11, 12, the cam disk roller 5 runs against the pawl 6 and is locked in said position by the pawl 6, for example when the tensioning gear 9 has rotated further by approximately ten degrees after the tensioning shaft 18 has reached the top dead center. As a result, rebounding of the cam disk roller 5 from the pawl 6 is made possible by way of the open dog clutch 20, and therefore stressing of the freewheel 3 is prevented.

In the tensioned state of the accumulator spring, the intermediate shaft 2 and components which are coupled to it, such as the pawl 6 and the cam disk roller 5, are decoupled from the intermediate gear 4 by way of the dog clutch 20, in order not to be loaded and stressed by way of the intermediate gear 4, for example in the case of the tensioning motor continuing to run. As a result, in particular, the loading of the pawl 6, the cam disk roller 5 and the freewheel 3 is advantageously reduced, and wear or damage of said components of the tensioning mechanism 1 as a result of said loading is prevented.

In order to release the energy which is stored in the tensioned accumulator spring, the coupling of the pawl 6 to the cam disk roller 5 is released. The accumulator spring which is relieved rotates the tensioning gear 9 in the same rotational direction as in the case of tensioning of the accumulator spring, as a result of which the resetting element 8 releases the switching pin 10 again and the first clutch block 12 is pushed by way of the restoring spring 14 to the second clutch block 11, with the result that the dog clutch 20 is closed again. As a result, the tensioning mechanism 1 is ready for renewed tensioning of the accumulator spring.

Figure 3:
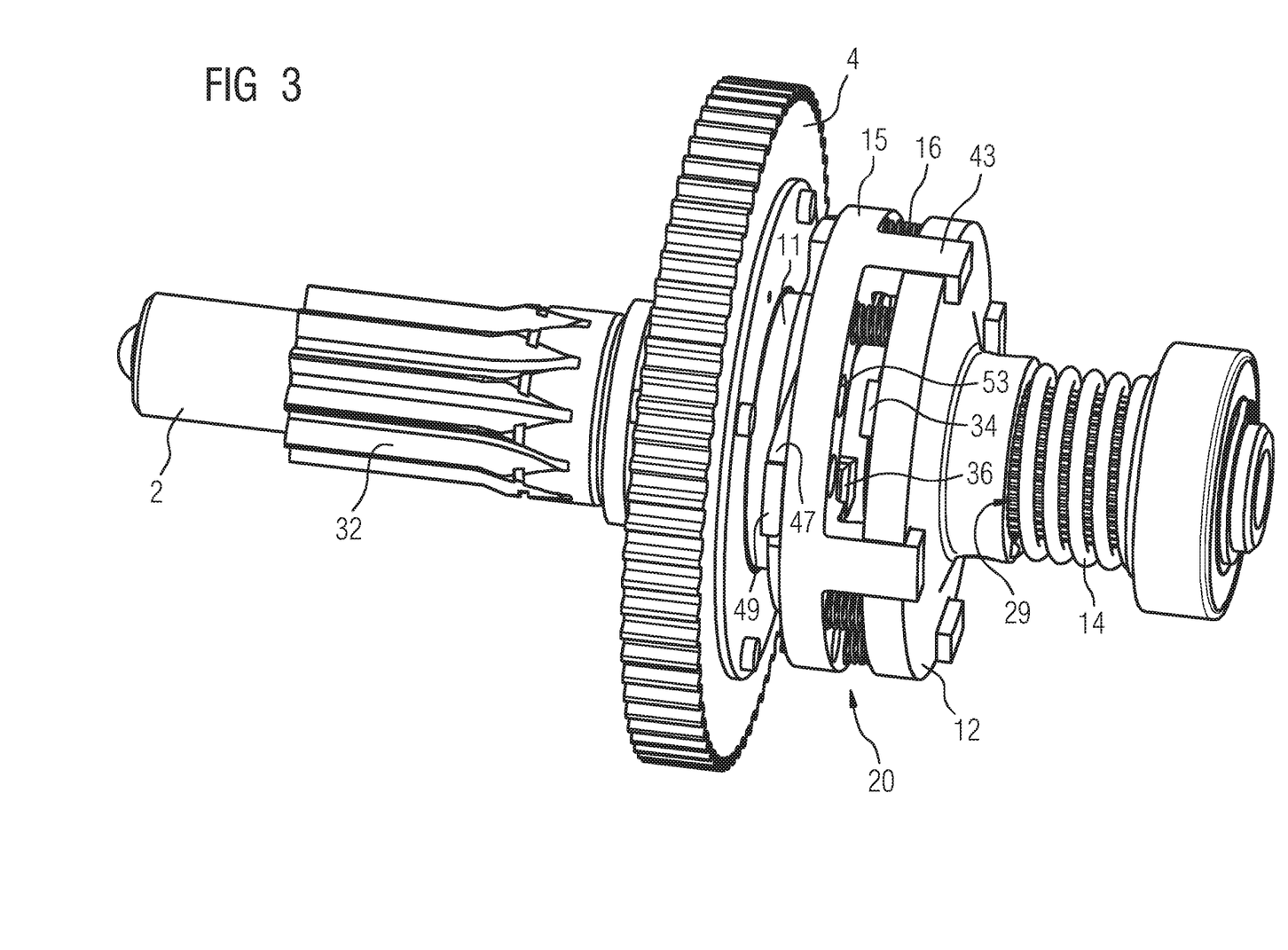
FIG. 3 shows a first perspective illustration of an intermediate shaft, an intermediate gear and a dog clutch.
Figure 4:
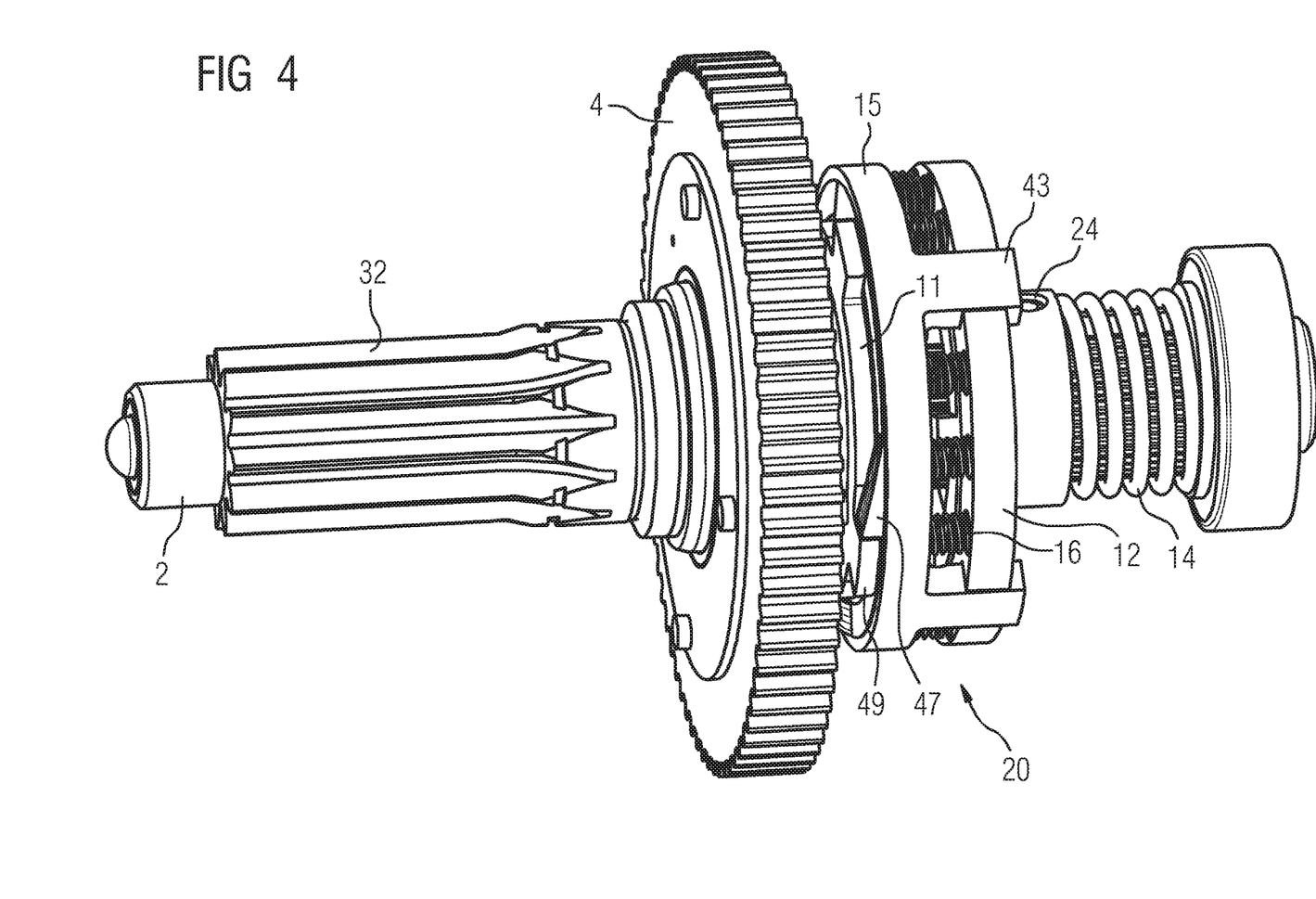
FIG. 4 shows a second perspective illustration of an intermediate shaft, an intermediate gear and a dog clutch.
Figure 5:
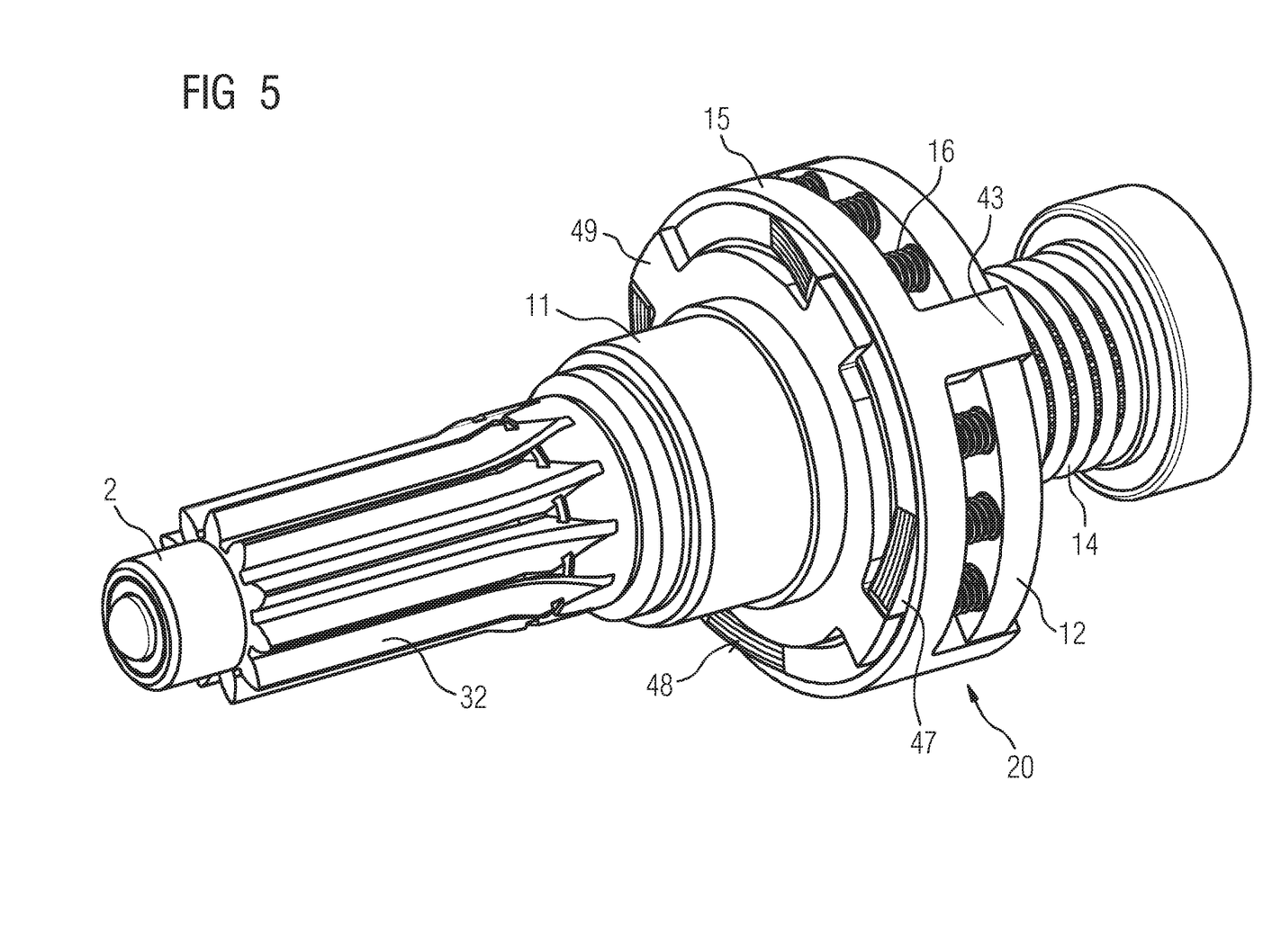
FIG. 5 shows a perspective illustration of an intermediate shaft and a dog clutch.
Figure 6:
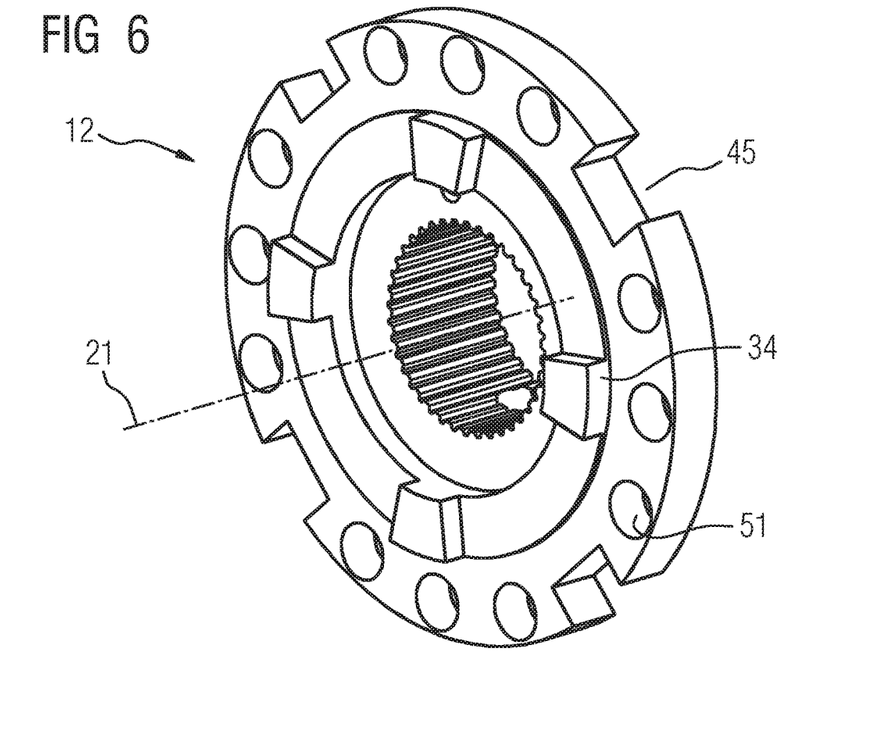
FIG. 6 shows a perspective illustration of a first clutch block.
Figure 7:
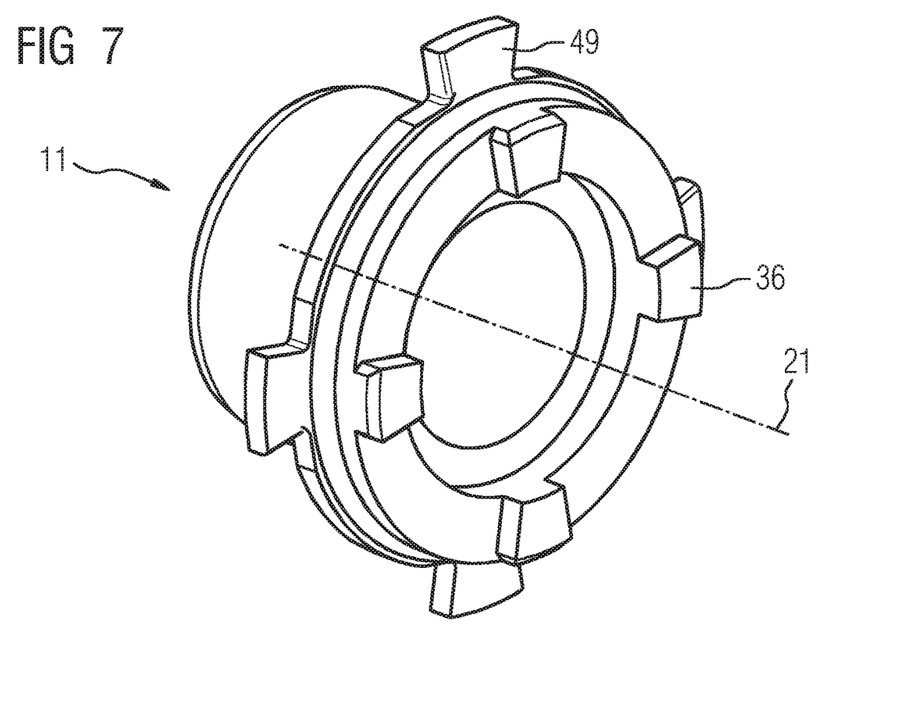
FIG. 7 shows a perspective illustration of a second clutch block.
Figure 8:
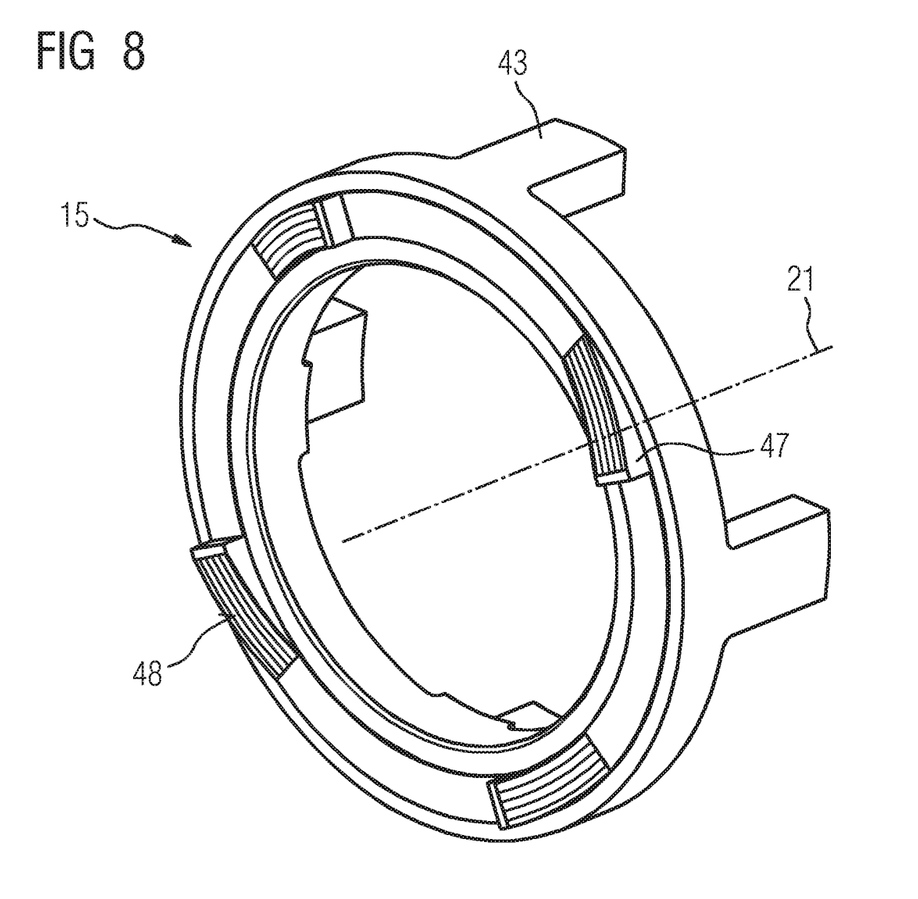
FIG. 8 shows a perspective illustration of a synchronizer ring.

FIGS. 3 to 8 show the dog clutch 20 and its components, and their coupling to the intermediate shaft 2. Here, FIGS. 3 and 4 show different perspective illustrations of the intermediate shaft 2, the intermediate gear 4 and the dog clutch 20, FIG. 5 shows a perspective illustration of the intermediate shaft 2 and the dog clutch 20, FIG. 6 shows a perspective illustration of the first clutch block 12, FIG. 7 shows a perspective illustration of the second clutch block 11, and FIG. 8 shows a perspective illustration of the synchronizer ring 15.

The synchronizer ring 15 has four ramp-shaped projections 47 which face the second clutch block 11 and are arranged equidistantly along a circle about the rotational axis 21 in a plane which is perpendicular with respect to the rotational axis 21. The ramp-shaped projections 47 have oblique faces 48 which are inclined with respect to said plane in such a way that all the oblique faces 48 rise with respect to the plane along the circle in a circulating direction.

The second clutch block 1 has four coupling teeth 49 which are arranged equidistantly along a circle about the rotational axis 21 in a plane which is perpendicular with respect to the rotational axis 21, and are directed toward the outside radially with respect to the rotational axis 21, with the result that they form the sections of the second clutch block 11 which protrude furthest to the outside. As shown in FIGS. 3 to 5, in each case one ramp-shaped projection 47 of the synchronizer ring 15 bears against the coupling teeth 49 in the case of a rotation of the synchronizer ring 15 relative to the second clutch block 11 in the first rotational direction about the rotational axis 21. As a result, in the case of a rotation of this type, the abovementioned positively locking connection of the synchronizer ring 15 to the second clutch block 11 is produced, which positively locking connection synchronizes the rotations of the two clutch blocks 11, 12.

In the case of a rotation of the synchronizer ring 15 relative to the second clutch block 11 in a second rotational direction about the rotational axis 21, which second rotational direction is opposed to the first rotational direction, the ramp-shaped projections 47 can slide on their oblique faces 48 over the coupling teeth 49. While the ramp-shaped projections 47 slide over the coupling teeth 49, the synchronizer ring 15 is displaced axially away from the second clutch block 11 against the spring elements 16. After the sliding of the ramp-shaped projections 47 over the coupling teeth 49, the synchronizer ring 15 is displaced axially by way of the spring elements 16 in the opposed direction toward the second clutch block 11. As a result, in the case of an open dog clutch 20, the synchronizer ring 15 can rotate relative to the second clutch block 11 in the second rotational direction. This makes, in particular, a rotation of the second clutch block 11 possible, which rotation is caused by way of the tensioning motor continuing to run when the tensioning gear 9 is locked by way of the locking mechanism 28 after the tensioning of the accumulator spring, and therefore the first clutch block 12 is also at a standstill.

The clutch blocks 11, 12 have dogs 34, 36 which correspond to one another and, in the first end position of the first clutch block 12, couple the two clutch blocks 11, 12 to one another in a positively locking manner in the case of rotations of the first clutch block 12 relative to the second clutch block 11 in the second rotational direction.

Here, the first clutch block 12 has four first dogs 34 which are arranged equidistantly along a circle about the rotational axis 21 in a plane which is perpendicular with respect to the rotational axis 21. The second clutch block 11 has four second dogs 36 which are likewise arranged equidistantly along a circle about the rotational axis 21 in a plane which is perpendicular with respect to the rotational axis 21. Here, the dogs 34, 36, ramp-shaped projections 47 and coupling teeth 49 are arranged in such a way that no first dog 34 lies directly opposite a second dog 36 when the ramp-shaped projections 47 bear against the coupling teeth 49. For example, the positions of the first dogs 34 correspond to the positions of the ramp-shaped projections 47, with the result that the position of each first dog 34 lies at least approximately in a half plane which is delimited by the rotational axis 15 and in which the position of a ramp-shaped projection 47 also lies. Accordingly, the positions of the second dogs 36 also correspond to the positions of the coupling teeth 49. Here, a position of a dog 34, 36 is understood to mean the position of a centroid of the dog 34, 36. The positions of the ramp-shaped projections 47 and coupling teeth 49 are defined correspondingly.

The spring elements 16 are configured as helical springs which extend in each case between a first spring recess 51 in the first clutch block 12 and a second spring recess 53 in the synchronizer ring 15. In the exemplary embodiment which is shown in the figures, three spring elements 16 are arranged between in each case two adjacent teeth 43 of the synchronizer ring 15, not all the spring elements 16 being shown in FIG. 3. In other exemplary embodiments, a different number of spring elements 16 can be provided.

Although the invention has been illustrated and described in greater detail by way of preferred exemplary embodiments, the invention is not restricted by way of the disclosed examples, and other variations can be derived herefrom by a person skilled in the art without departing from the scope of protection of the invention.

The invention claimed is:

1. A tensioning mechanism for tensioning an accumulator spring of a spring stored energy mechanism, the tensioning mechanism comprising:
   a tensioning gear coupled to the accumulator spring;
   an intermediate shaft coupled to said tensioning gear;
   an intermediate gear to be driven by a tensioning motor;
   a freewheel coupled to said intermediate gear;
   a dog clutch with a first clutch block coupled fixedly to said intermediate shaft so as to rotate with said intermediate shaft, a second clutch block connected to said freewheel, and a synchronizer ring disposed between said first and second clutch blocks and is coupled fixedly to said first clutch block so as to rotate with said first clutch block, said synchronizer ring being displaceable parallel to a rotational axis of said intermediate shaft relative to said first clutch block, and is pressed onto said second clutch block;
   it being possible for said first clutch block to be displaced parallel to the rotational axis between a first end position, in which said first clutch block bears against said second clutch block and in the first end position a tensioning of the accumulator spring occurs, and a second end position, in which said first clutch block is disconnected from the second clutch block and in the second end position it is assumed that the accumulator spring is in a tensioned state; and
   said synchronizer ring coupling in a form-locking manner to said second clutch block in a case of a rotation relative to said second clutch block in a first rotational direction about the rotational axis, and, in a case of an open said dog clutch, it being possible for said synchronizer ring to be rotated relative to said second clutch block in a second rotational direction about the rotational axis, the second rotational direction being opposed to the first rotational direction.

2. The tensioning mechanism according to claim 1, wherein said synchronizer ring has a plurality of ramp-shaped projections which face said second clutch block and are disposed around said intermediate shaft, and said second clutch block has a plurality of coupling teeth which are disposed around said intermediate shaft and against which in each case one of said ramp-shaped projections of said synchronizer ring bears in a case of a rotation of said synchronizer ring relative to said second clutch block in the first rotational direction about the rotational axis, and over said coupling teeth said ramp-shaped projections of said synchronizer ring can slide in a case of a rotation of said synchronizer ring relative to said second clutch block in the second rotational direction about the rotational axis.

3. The tensioning mechanism according to claim 2, wherein said coupling teeth are directed toward an outside radially with respect to the rotational axis in a plane which is perpendicular with respect to the rotational axis.

4. The tensioning mechanism according to claim 2, wherein said ramp-shaped projections of said synchronizer ring and said coupling teeth of said second clutch block are disposed equidistantly along a circle about the rotational axis in each case in a plane which is perpendicular with respect to the rotational axis.

5. The tensioning mechanism according to claim 2, wherein said synchronizer ring has four said ramp-shaped projections, and said second clutch block has four said coupling teeth.

6. The tensioning mechanism according to claim 1, further comprising at least one spring element which couples said synchronizer ring to said first clutch block and presses said synchronizer ring onto said second clutch block.

7. The tensioning mechanism according to claim 1, wherein said first and second clutch blocks have dogs which correspond to one another and, in the first end position of said first clutch block, couple said first and second clutch blocks to one another in a form-locking manner in a case of rotations of said first clutch block relative to said second clutch block in the second rotational direction.

8. The tensioning mechanism according to claim 1,
   wherein said intermediate shaft has a transverse opening formed therein; and
   further comprising a coupling element connected to said first clutch block, said coupling element is guided through said transverse opening in said intermediate shaft, said transverse opening running perpendicularly with respect to the rotational axis of said intermediate shaft, said coupling element being displaced parallel to the rotational axis of said intermediate shaft in said transverse opening between a first position which defines the first end position of said first clutch block and a second position which defines the second end position of said first clutch block.

9. The tensioning mechanism according to claim 8, wherein:
   said first clutch block has recesses formed therein; and
   said coupling element having ends and is configured as a tube or bolt, said coupling element having a longitudinal axis disposed perpendicularly with respect to the rotational axis of said intermediate shaft and said ends of said coupling element protrude into said recesses in said first clutch block.

10. The tensioning mechanism according to claim 8, wherein said intermediate shaft having a longitudinal opening formed therein; and further comprising a switching pin mounted displaceably in said intermediate shaft in said longitudinal opening running along the rotational axis of said intermediate shaft, and is coupled to said coupling element.

11. The tensioning mechanism according to claim 10, wherein said switching pin has a resetting end which protrudes out of said longitudinal opening;

further comprising a resetting element disposed on said tensioning gear, said resetting element displaces said resetting end of said switching pin toward said longitudinal opening in the tensioned state of the accumulator spring, with the result that said coupling element is displaced from the first position into the second position.

12. The tensioning mechanism according to claim 11, wherein said resetting element has a contact end which projects radially from said tensioning gear and a contact face which bears against said resetting end of said switching pin in a case of a displacement of said switching pin.

13. The tensioning mechanism according to claim 1, further comprising a restoring spring coupled to said first clutch block and exerts a spring force in a direction of said second clutch block on said first clutch block.

14. The tensioning mechanism according to claim 13, further comprising a locking mechanism for releasably locking said tensioning gear in the tensioned state of the accumulator spring.

15. A spring stored energy mechanism, comprising:
a tensioning mechanism according to claim 1.

* * * * *